US006888443B2

(12) United States Patent
Ritter

(10) Patent No.: US 6,888,443 B2
(45) Date of Patent: May 3, 2005

(54) INFORMATION SYSTEM FOR PUBLIC TRANSPORTATION AND CORRESPONDING COMMUNICATION METHOD

(75) Inventor: Rudolf Ritter, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/998,281

(22) Filed: Nov. 30, 2001

(65) Prior Publication Data

US 2002/0094829 A1 Jul. 18, 2002

Related U.S. Application Data

(63) Continuation of application No. PCT/CH99/00299, filed on Jul. 6, 1999.

(51) Int. Cl.[7] .......... H04Q 1/00

(52) U.S. Cl. .......... 340/5.64; 340/5.8; 455/556; 725/76; 725/8; 345/864

(58) Field of Search .......... 340/5.64, 5.8; 455/556; 725/75, 76, 1–8; 345/864; 235/383

(56) References Cited

U.S. PATENT DOCUMENTS

| | | | | | |
|---|---|---|---|---|---|
| 4,866,515 | A | * | 9/1989 | Tagawa et al. | 725/77 |
| 5,555,466 | A | * | 9/1996 | Scribner et al. | 725/75 |
| 5,579,535 | A | * | 11/1996 | Orlen et al. | 340/905 |
| 5,801,751 | A | * | 9/1998 | Sklar et al. | 725/76 |
| 5,835,127 | A | * | 11/1998 | Booth et al. | 725/76 |
| 5,973,722 | A | * | 10/1999 | Wakai et al. | 725/76 |
| 5,979,757 | A | * | 11/1999 | Tracy et al. | 235/383 |
| 5,982,520 | A | * | 11/1999 | Weiser et al. | 398/126 |
| 6,040,829 | A | * | 3/2000 | Croy et al. | 345/864 |
| 6,175,922 | B1 | * | 1/2001 | Wang | 713/182 |
| 6,386,451 | B1 | * | 5/2002 | Sehr | 235/384 |
| 6,434,403 | B1 | * | 8/2002 | Ausems et al. | 455/556 |
| 2002/0059614 | A1 | * | 5/2002 | Lipsanen et al. | 725/75 |
| 2002/0087992 | A1 | * | 7/2002 | Bengeult et al. | 725/76 |
| 2003/0009761 | A1 | * | 1/2003 | Miller et al. | 725/76 |

* cited by examiner

*Primary Examiner*—Brian Zimmerman
(74) *Attorney, Agent, or Firm*—Pearne & Gordon LLP

(57) ABSTRACT

An information system for vehicles (35) includes a plurality of contactless transceivers (31–32) oriented in the direction of the passengers (36) that allow a data transfer at close range, with a central data processor (2). A data bus (3) is connected with the transceivers (31–32) and with the central data processor (2), so that data can be transmitted between private portable terminals (4) of the passengers and the central data processor (2) in both directions over the transceivers (31–32) and the data bus (3). The portable terminals (4) additionally store passengers' identification data in such a manner that the identification data are transmitted to the central data processor, so that the system can check the passengers' travel authorizations.

30 Claims, 5 Drawing Sheets

INFORMATION SYSTEM FOR PUBLIC TRANSPORTATION AND CORRESPONDING COMMUNICATION METHOD

This application is a continuation of PCT Application No. PCT/CH99/00299 filed Jul. 6, 1999.

FIELD OF THE INVENTION

The present invention lies in the field of traffic telematics (tele-transmission of computerized traffic information) and concerns a communication system for vehicles, for example a communication system for public transportation vehicles such as for example trains, buses or subways.

RELATED ART

Systems are known with which data, for example multimedia data, for example an entertainment program, can be distributed to passengers of a vehicle. Some systems are interactive and have a reverse channel over which the passengers can for example order a new entertainment program or participate in game contests. These systems generally use terminals that belong to the vehicle. A disadvantage of these systems is that the passengers are seldom familiar with such terminals so that only simple functions can be proposed. In order to prevent the terminals from being stolen, non-standardized devices that are useless outside the vehicle are often put into use. Such terminals not destined for the broad public are however usually expensive.

In addition, systems are known for checking electronically the travel authorization of passengers. Such a system has been described among others in patent EP0465456. Trains are equipped at the doors with appropriate readers in order to record the ingress and egress of passengers who have been provided with a contactless identification element. Travel data comprising the time of ingress and egress of every identified passenger are forwarded from the trains to a central that bills the traveled distance to the passengers on a monthly basis. The identification element used has no controls, which greatly restricts its possible uses. It is for example not possible to book seats with this system.

It is an aim of the present invention to propose a new and improved communication system for vehicles, in particular for public transportation vehicles.

It is another aim of this invention to propose a new communication system that can be used both for the distribution of information and entertainment programs to passengers as well as for checking their travel authorization.

It is another aim of this invention to propose a new communication system that is compatible with a plurality of terminals that can also belong to the passengers.

BRIEF SUMMARY OF THE INVENTION

According to the present invention, these aims are achieved in particular through an information system having the characteristics of claim 1.

In particular, these aims of the invention are achieved with an information system in which the data within the vehicle can be transmitted to the passengers over a data bus and a plurality of contactless transceivers.

A standardized contactless interface is preferably used in order that the passengers can use their own familiar terminal.

Central data processing means are provided in the vehicle and are connected with said data bus. The contactless interface is preferably bi-directional so that data can be transmitted in both directions between the passengers and the central data processing means.

The method according to the invention can thus be used for distributing information, for example travel information, and entertainment programs, including advertising, as well as for billing the traveled distance.

DESCRIPTION OF THE DRAWINGS

Preferred embodiments of the invention will be described hereafter in more detail with the aid of the attached drawings, in which.

DETAILED DESCRIPTION OF THE INVENTION

Figure 1:
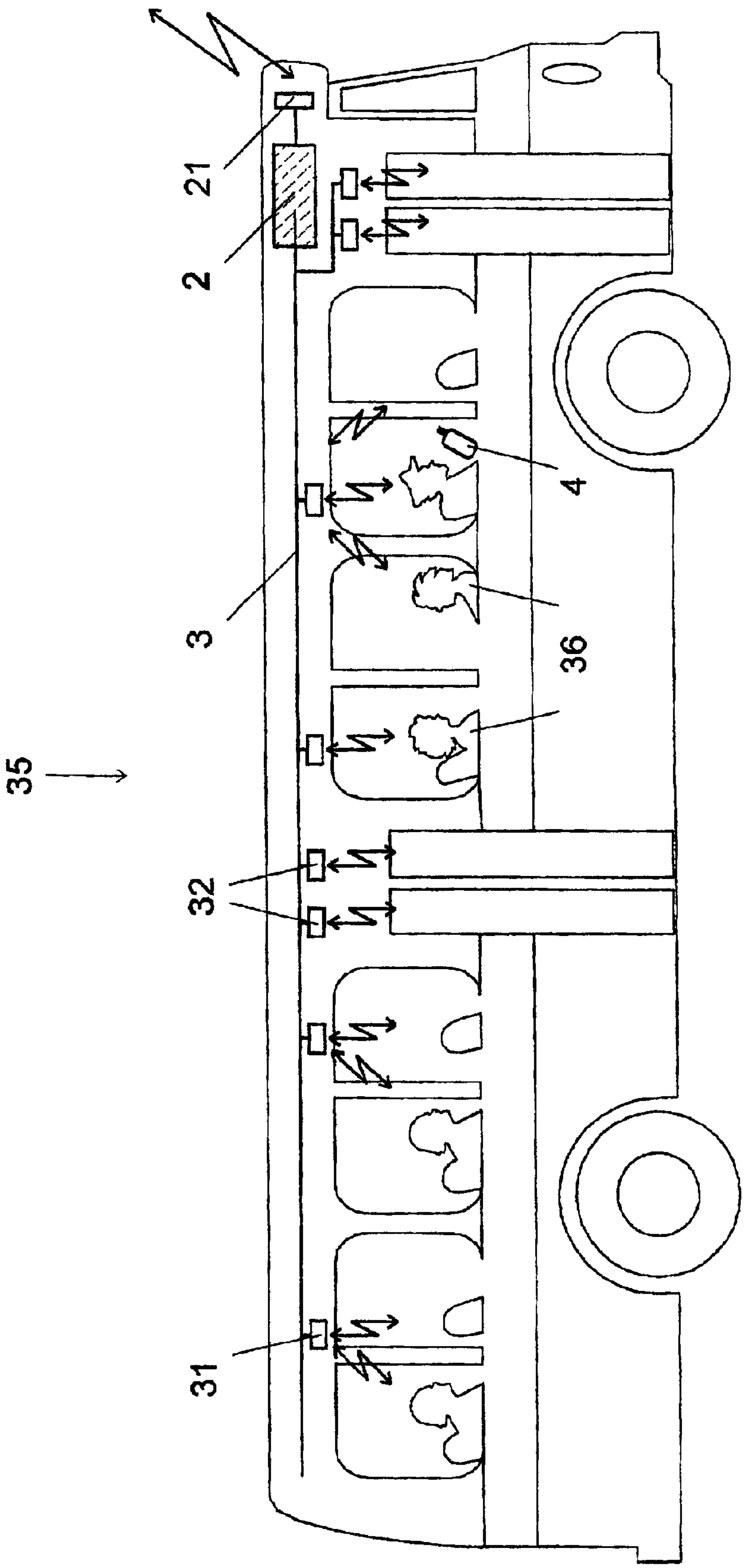
FIG. 1 shows a diagrammatic view of a vehicle, in this example a bus, with an information system according to one embodiment of the invention.

FIG. 1 shows a vehicle, in this example a bus 35, with an information system according to the invention. The invention can however be used for any type of public transportation vehicle, for example also for trains, subways, boats or airplanes.

The information system comprises central data processing means 2, for example a computer with appropriate interfaces, or a digital radio receiver with a processor, as well as a data bus 3 that connects the central data processing means 2 with a plurality of transceivers 31, 32. Each transceiver has an antenna oriented within the vehicle and in the direction of the passengers. Certain transceivers 32 are preferably installed close to the doors in order to monitor the ingress and egress of passengers.

Figure 2:
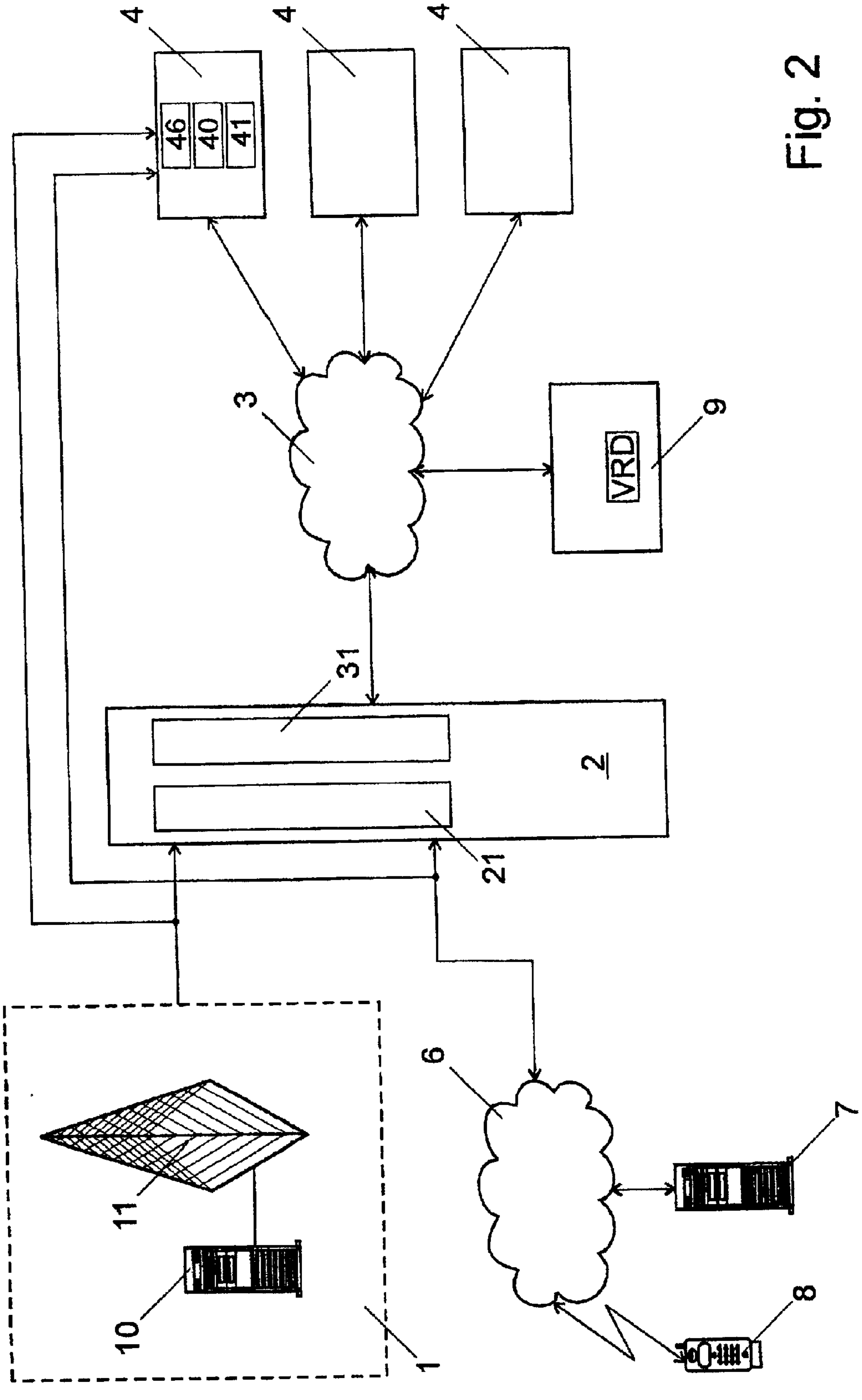
FIG. 2 shows a block diagram of the system according to the invention.

The central data processing means 2 have, or are connected with, at least one radio receiver 21 over which data from at least one sender 1, 7, 8 (FIG. 2) outside the vehicle can be received. According to the application, the radio receiver 21 can receive and/or send and if necessary process the following data:

- Radio programs, preferably digital radio programs of a radio station 1 broadcasting according to the DAB (Digital Audio Broadcasting) standard, including accompanying data;
- Television programs, preferably digital television programs, for example according to the DVB (Digital Video Broadcasting) standard, including accompanying data;
- Data transmitted through a mobile radio network 6, for example through a GSM (Global System for Mobile Communications) or UMTS network, including SMS (Short Message System), USSD (Unstructured Supplementary Service Data) and WAP (Wireless Application Protocol) data, it being possible to exchange these data with a mobile device 8 or with a server 7;

Data from a location-determining system, for example GPS data;

Data from another vehicle, for example data from another coach in a train;

etc.

These different data are converted in the data processing means 2 into another format, for example in the Bluetooth format, and addressed over the electronic bus 3 and the transceivers 31–32 to the passengers 36 in question.

The passengers 36 have personal terminals 4, each terminal containing an identification module 40 (FIG. 2) in which user-specific data are stored, as well as a contactless interface 41 over which a radio connection can be established with the transceivers 31–32.

The contactless interface 41 allows a radio connection at close range (typically up to a maximum of 20 meters) and comprises preferably a chip, for example a RFID (Radio Frequency Identification) chip, and an antenna. The chip comprises a radio part and data processing means in base frequency range and operates for example in microwave range. Depending on the frequency used, the antenna can also be integrated in the chip or consist of a wound coil.

Figure 3:
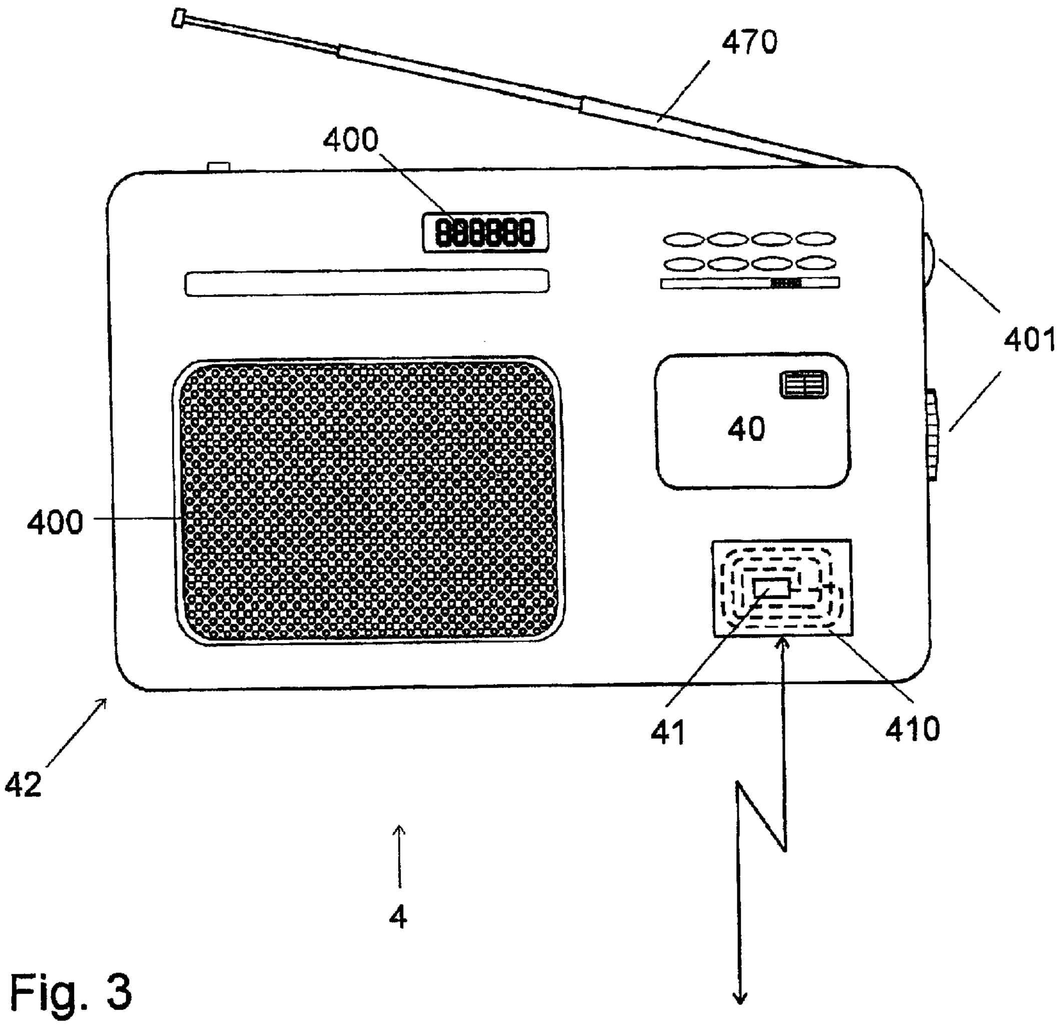
FIG. 3 shows a diagrammatic view of another embodiment of an identification module, here in the form of a portable radio receiver.
Figure 4:
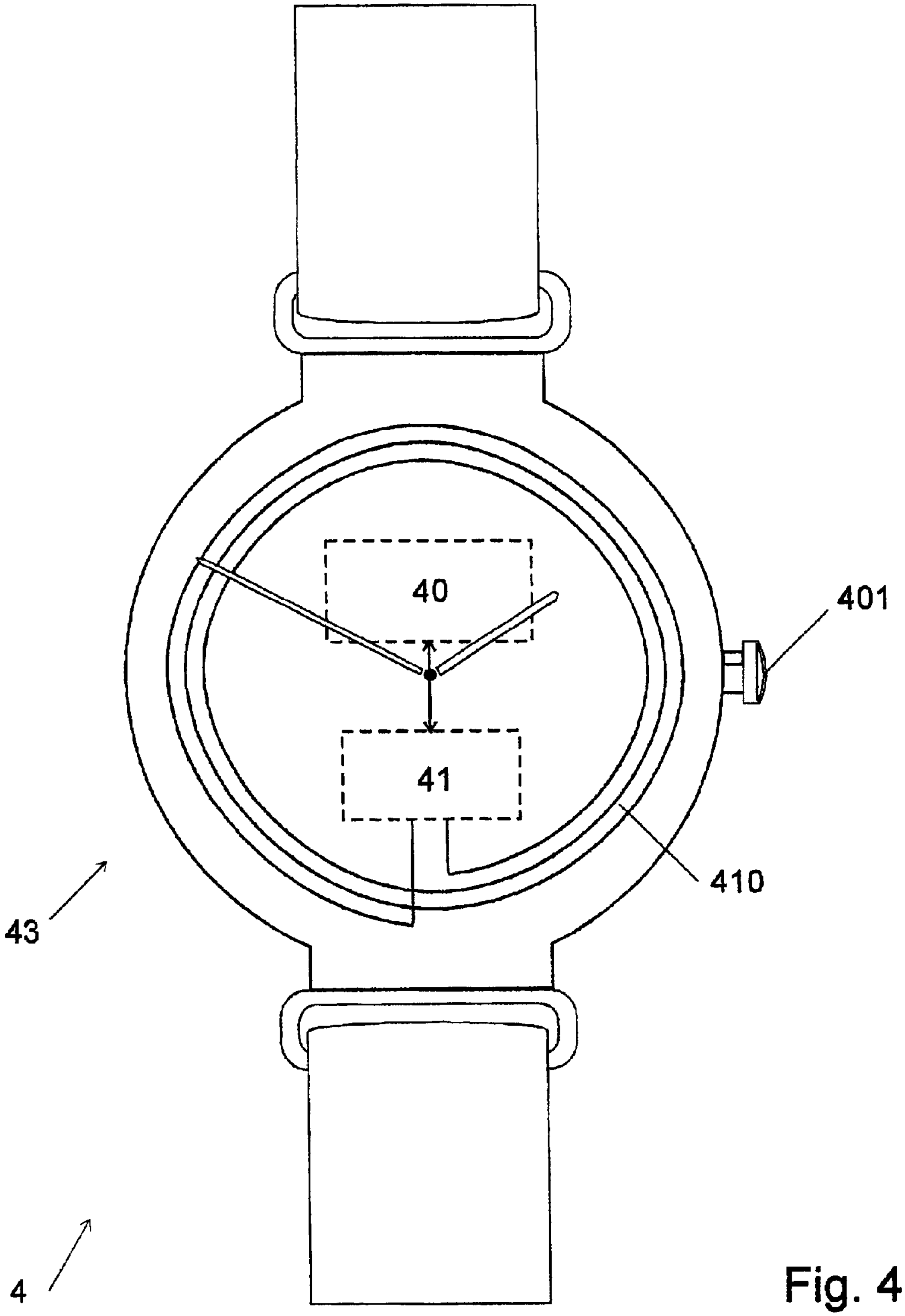
FIG. 4 shows a diagrammatic view of another embodiment of an identification module, here in the form of a wristwatch.

According to the embodiment, the terminal 4 can be in the form of a portable radio receiver 42 (FIG. 3), of a mobile telephone (not represented), of a palmtop or laptop computer (not represented), of a wristwatch 43 (FIG. 4), or of a chip-card 44 (FIG. 5), preferably in ISO format. Terminals of different types can also be combined within a single vehicle. According to the embodiment, the terminal can have different data reproduction means 400, for example a display and/or loudspeaker, and different input means 401, for example a keyboard, a touch-screen and/or an apparatus for determining the position of the eye. The display can be for example a LCD (Liquid Crystal Display) and/or preferably a VRD (Virtual Retina Display) and thus reproduce the operating status as well as received images and texts. The identification module 40 consists for example of a removable chip-card, for example a SIM (Subscriber Identification Module) card, or of a secured storage area (virtual SIM card) in the terminal. The contactless interface 41 preferably allows a bi-directional data transfer with the transceivers 31, 32. Preferably, a standardized protocol is used for this interface, for example the Bluetooth or HomeRF protocol, so that standardized terminals 4 can be used. The contactless interface can also consist of a RFID (Radio Frequency Identification) element. According to the embodiment, the terminal 4 has its own energy supply means, for example a battery or solar cell, or can be powered by the transceivers 31–32.

In a variant embodiment of the invention, at least some of the terminals contain an additional radio receiver 46, with which data from an external sender can be received.

When the passenger 36 enters the vehicle 35 with his terminal 4, his identification parameters stored in the identification module 40 are collected over said contactless interface 41 and the transceivers 32 near the doors and transmitted to the data processing means 2. The passenger's identification parameters comprise for example his name, his user number and if necessary the identification of his home provider. If the identification module 4 can also be used as a SIM (Subscriber Identification Module) card in a mobile telephone, the user's identity can also consist of his IMSI (International Mobile Subscriber identification) number in the mobile radio network. In a variant embodiment, biometric parameters, for example a photograph, a finger print or an image of the passenger's retina are also stored in the identification module 40.

In a preferred embodiment, authorization data of the passenger are also read by the transceivers 32, the authorization comprising for example booking data, type of season ticket, pre-paid tickets etc.

According to the embodiment and application, the transmission of the identification parameters when entering or leaving the vehicle 35 can be triggered by the passenger or the transceivers 32. The identification parameters are read in the identification module 40 by a software program executed by the terminal 4 or the module 40 and transmitted by means of appropriate communication protocols over the contactless interface to the transceivers 32, where they are forwarded over the mentioned electronic bus 3 to the central data processing means 2.

A software program in the data processing means 2 records the passengers' time of ingress and egress and determines with it the travel fee to be billed. If the data processing means 2 are connected with a location-determining device, the users' place of ingress and egress is preferably also used for billing. The computed fee can then be billed with a monthly fee of the transport company or, in a variant embodiment, it can be debited directly over said contactless interface from a pre-paid electronic account in the users' identification module 40.

The data processing means 2 can receive over said additional radio receiver 21 a list of authorizations resp. of bookings or of blocked identification modules and thus establish whether the passenger is allowed to enter or whether he is barred from the vehicle. If the passenger is barred from the vehicle, the data processing means 2 can for example take appropriate measures in order to refuse access to the passenger, for example acoustic or optical warning signals can be activated and/or the relevant entrances closed resp. not opened.

If the passenger is allowed to board, he can enter the vehicle and take a seat. In the vehicle, additional transceivers 31 are provided that collect the identification parameters in the passenger's identification module 40 and forward them to the central data processing means 2. These data processing means can for example check whether the passenger is occupying the seat reserved for him in an allowed travel class. For this purpose, the transmitted authorization data can for example include booking information and/or travel class indications.

The bookings can be made by the passengers in advance over any sales channel, for example by telephone, over the Internet, at a counter or with the method described in patent application PCT/CH96/00464. The booking details are preferably stored in a server 7 of the transport company and are either downloaded in the identification module 40 or transmitted over the mentioned radio receiver 21 to the data processing means 2. If the booking indications are available in the identification module, the passenger can read this booking, for example the seat number, on the display 400 of his terminal 4.

If the passenger moves towards a seat that is not allowed to him, a written or spoken message can appear on his personal terminal. When he finds his reserved seat, he can be welcomed by name; the reserved seat can then be labeled as "reserved" or "reserved and occupied".

When the passenger 36 is seated at his seat, he can receive data over the transceivers 31 and have them reproduced or processed on his personal terminal 4. The data received can include for example tourist information, advertising, music, entertainment programs etc. Certain data can be generated by the vehicle's driver and transmitted over the electronic bus 3 to every or to selected passengers. Other information, for example DAB or DVB programs and accompanying data received over the radio receiver 21, can be converted into an appropriate format, for example Bluetooth format, and addressed to the passengers 36.

If the data processing means 2 are connected with location-determining means 21, for example with a GPS receiver, location-dependent data can also be transmitted to the passengers, for example indications relating to the next stop. This location-dependent information can be either generated in the vehicle 35 and/or received as program-accompanying data and filtered depending on the location information determined in the vehicle.

The interface between the terminals 4 and the transceivers 31 is preferably bi-directional. The passengers can thus, with appropriate controls of their terminals, trigger certain actions with the data processing means. For example, every passenger can request over this channel that the vehicle should stop at the next station or request a change of seat and/or class.

The position of the identified passengers in the vehicle is preferably stored temporarily in the data processing means 2. In this way, for example certain data sent over the data bus can be addressed according to said stored position and forwarded only by the transceiver that is situated closest to the addressed passenger.

The passengers in the vehicle can communicate with one another over said data bus, for example telephone or play with one another. If the data processing means 21 are connected with a mobile radio system 6, for example with a GSM or UMTS mobile radio system, the passengers can also log into this mobile radio system over the aforementioned contactless interface 4-31 and the data bus 3 and establish connections. In this manner, passengers who have no mobile radio telephone but have a terminal 4 with a suitable interface 41 can make telephone calls or send and receive e-mails when they are in the vehicle 35.

For this purpose, in a first variant embodiment, temporary IMSI (International Mobile Subscriber Identification) and MSISDN (Mobile Subscriber ISDN) are provided by the operator of the vehicle 35. Each vehicle 35 has in this embodiment one or several IMSI numbers that are converted in the data processing means 2 into a suitable address for the data bus. In order to establish a connection, a passenger borrows one of the available IMSI numbers allocated to him during the connection. In this embodiment, the telecommunication costs incurred during the connection are charged by the operator of the mobile radio network 6 through known mechanisms to the operator of the vehicle 35, who bills these costs with a supplement to the passenger on the travel bill.

In a second variant embodiment, the passenger has a subscription with the operator of his home mobile radio network 6. The IMSI number and the MSISDN number are then stored in the identification module 40 in the terminal 4 and are forwarded to the data processing means 2 as soon as the passenger has taken his seat. The communication system in the vehicle 35 behaves in this embodiment as a visited network (VPLMN—Visited Public Land Mobile Network) with a roaming agreement with the operator of the mobile radio network 6, and administers a visitor register (VLR—Visitor Location Register), into which the passenger's IMSI is copied. The mobile radio part connected with the data processing means 2 can log into the mobile radio network 6 through the known roaming method with this IMSI number, so that calls can automatically be forwarded to the passenger. In this embodiment, the mobile radio network operator can charge the incurred telecommunication costs directly to the user of the terminal 4. The billing receipts established by the mobile radio network operator, for example CDR (Call Details Records) can for example be converted in the data processing means 2 into a suitable format in order for them to be forwarded over the data bus 3 and for example automatically debited from an electronic account in the identification module 4 or billed monthly.

The system according to the invention can also be put to use when the travel authorization is not checked at ingress and egress, but within the vehicle. For this purpose, a so-called polling method can for example be used. In this case, the central data processing means call up all passengers in the vehicle at regular intervals. Every terminal 4 receiving this call replies with a message in which the identification data are preferably comprised. In this manner, the central data processing means regularly receive a list of all terminals in the vehicle.

Figure 5:
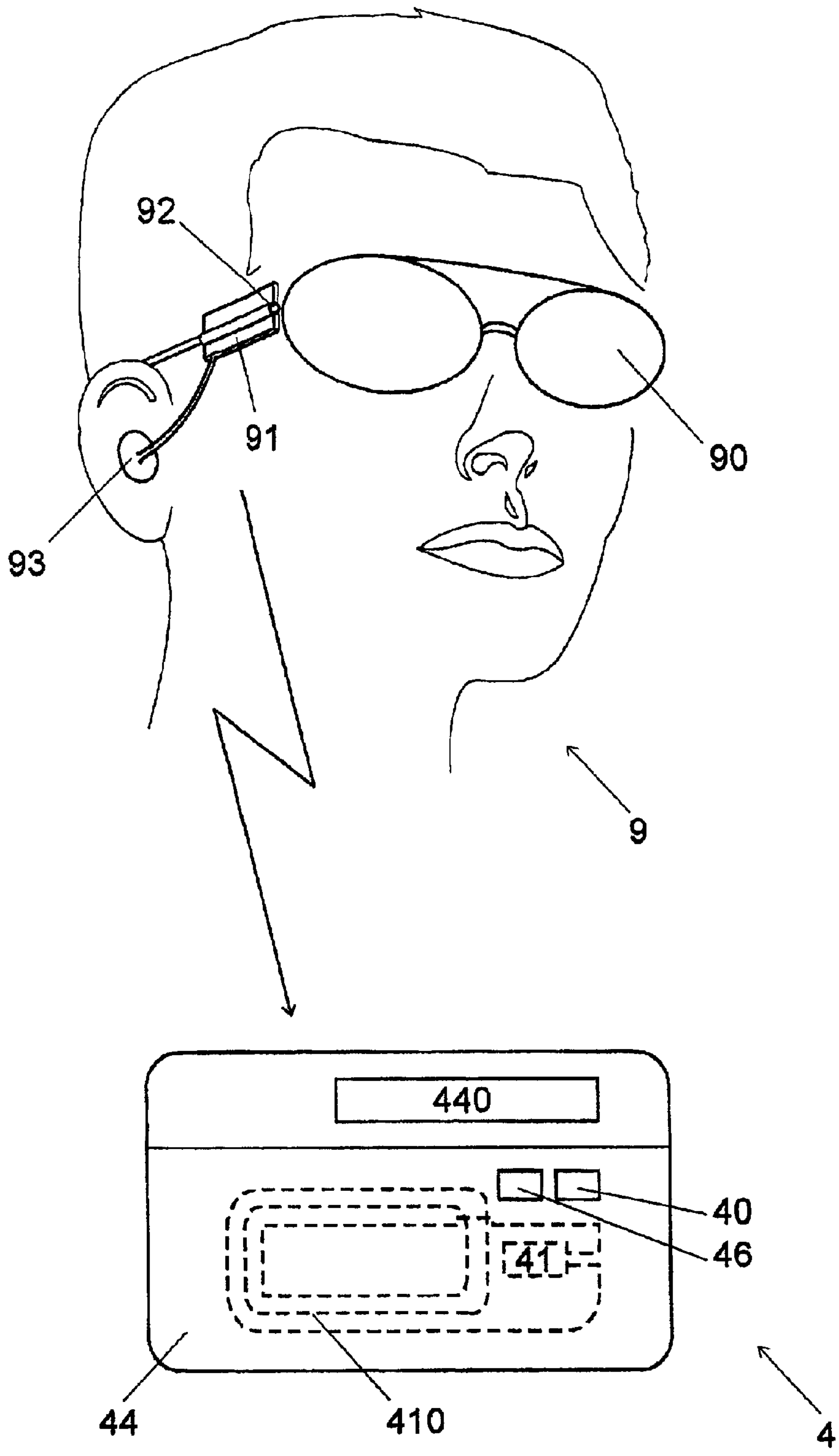
FIG. 5 shows a diagrammatic view of an identification module, in this example a contactless chip-card, with an authorization-checking device, in this example glasses with a VRD (Virtual Retina Display).

The system according to the invention can however also be used when the tickets are checked by a controller 9 (FIG. 5). The controller has in this case preferably a portable authorization-checking device 90 having, integrated in the housing 91, a contactless interface that can connect with the passengers' terminals in order to collect the authorization and identification data stored in the identification module 40. The data collected comprise for example the passenger's booking details and electronic ticket resp. season ticket, as well as, in a preferred embodiment, biometric parameters of the passenger, for example a photograph of the passenger. On the basis of these biometric parameters, the controller can check whether the terminal really belongs to the passenger. The authorization-checking device includes reproduction means 92 and 93 in order to reproduce these authorization indications and identification data optically and/or acoustically. These indications can for example be displayed on a display, for example on a LCD, of the checking device and/or read with a voice synthesizer and reproduced acoustically in the controller's headphones 93. In the represented preferred embodiment, these indications are projected optically with a VRD (Virtual Retina Display) device 92 onto the controller's retina.

Electronic encryption and signature means are preferably provided in order to encrypt the data transmitted over said contactless interface and to sign these data electronically. For this purpose, TTP (Trusted Third Party) mechanisms are preferably used. The identification module in the terminal preferably includes a private and a public key, so as to guarantee an end-to-end encryption up to the data processing means 2 and preferably beyond up to the external devices 1, 7, 8.

What is claimed is:

1. An information system for a vehicle, comprising:

a plurality of contactless transceivers that allow a data transfer at close range with privae portable terminals within the vehicle, central data processing means including means for checking the passengers travel authorizations, a data bus that is connected with said transceivers and with said data processing means, so that data can be transmitted between said private portable terminals and said central data processing means in both directions over said transceivers and said data bus, wherein said private portable terminals are adapted for being carried by passengers, means for distributing information and entertainment programs to said portable terminals for use by the passengers, and means for storing passengers' identification data in said portable terminals in such a manner that these identification data are transmitted to said central data processing means, so that said system can check the passengers' travel authorizations.

2. The information system of claim 1, wherein at least one radio receiver is connected with said central data processing means that can receive data from a sender outside the vehicle.

3. The information system of claim 2, wherein a bi-directional data transfer is possible between said radio receiver and said sender.

4. The information system of claim 3, wherein the data received with said radio receiver are converted into a format compatible with said data bus.

5. The information system of claim 3, wherein said transceivers are suitable for a communication with RFID elements.

6. The information system of claim 3, wherein said transceivers are suitable for a communication according to the Bluetooth standard.

7. The information system of claim 3, wherein said transceivers are suitable for a communication according to the HomeRF standard.

8. The information system of claim 2, wherein said radio receiver can receive DAB program-accompanying data.

9. The information system of claim 2, wherein said radio receiver can receive DVB program-accompanying data.

10. The information system of claim 3, wherein said radio receiver can receive and send GSM data.

11. The information system of claim 3, wherein said radio receiver can receive and send UMTS data.

12. The information system of claim 10, wherein a voice and/or data communication between the passengers in the vehicle and subscribers of an external mobile radio network can take place over said data bus and said radio receiver.

13. The information system of claim 12, wherein temporary mobile network identifications are provided by the operator of the vehicle.

14. The information system of claim 12, wherein said data processing means comprise a visitor register in which the passengers' personal identifications in said mobile radio network are stored.

15. The information system claim 1, wherein a voice and/or data communication between the passengers in the vehicle can take place over said data bus.

16. The information system of claim 1, wherein at least one said transceiver is intended for checking the entering and leaving passengers at the doors of the vehicle.

17. The information system of claim 16, wherein the position of the identified passengers in the vehicle is stored in said data processing means.

18. The information system of claim 17, wherein at least certain data transmitted over said data bus are addressed depending on said stored position.

19. The information system of claim 1, wherein a software module for computing the traveled distance is executed in said central data processing means.

20. The information system of claim 19, wherein said software—module uses the passengers' identification stored in said private terminals of these passengers.

21. The information system of claim 1, wherein a location determining module is connected with said central data processing means.

22. The information system of claim 21, wherein location-dependent information is selected depending on said location-determining module and distributed to passengers.

23. A method for checking the travel authorizations of passengers in a vehicle, comprising the steps of:

checking the passengers' travel authorizations being stored in portable personal terminals adapted for being carried by the passengers, transmitting said travel authorizations to central data processing means over a data bus, and distributing information and entertainment programs over the data bus to the passengers.

24. The method of claim 23, wherein said information and entertainment programs are reproduced with said personal terminals.

25. The communication method of claim 23, wherein the passengers log into an external mobile radio network over said data bus.

26. The communication method of claim 25, wherein a temporary user identification is provided by the operator of the vehicle.

27. The communication method of claim 26, wherein the passengers' personal user identification in the external mobile radio network is stored in a visitor register in the vehicle.

28. Information system for vehicles, comprising:

a plurality of short range radio transceivers that allow a bidirectional data transfer at close range with a plurality of portable personal terminals within the vehicle, wherein each of said portable personal terminals is adapted for being carried by a passenger;

central data processing means including means for checking the passengers' travel authorization, a data bus that is connected with said transceivers and with said data processing means, so that data can be transmitted between the private portable terminals and said central data processing means in both directions over said transceivers and said data bus, means for distributing information and entertainment programs to the portable terminals and means for storing passengers' identification data in the portable terminals in such a manner that these identification data are transmitted to said central data processing means for checking the passengers' travel authorizations.

29. The information system of claim 28, wherein said transceivers and said terminals are suitable for a communication according to the Bluetooth standard.

30. An information system for a vehicle, comprising:

a portable private terminal adapted for being carried by a passenger and including:

a memory for storing passenger identification data, and an output for providing entertainment and/or informational content to the passenger;

a wireless transceiver that allows a data transfer at close range with said portable terminals within or near the vehicle;

a central processor for checking a travel authorization of the passenger;

a data bus connected with said central processor and wirelessly connected with said private portable terminals in both directions over said transceivers; wherein said identification data is transmitted to said central data processing means from said private terminals over said data bus for checking said travel authorization of the passenger, and further wherein information and/or entertainment programs are transmitted to said portable terminal over the data bus for use by the passenger.

* * * * *